E. N. ARCHAVLIS.
HYDRAULIC MACHINE FOR PRESSING OLIVES.
APPLICATION FILED AUG. 8, 1917.

1,282,021.

Patented Oct. 22, 1918.
5 SHEETS—SHEET 1.

Witnesses:

Inventor
E. N. Archavlis

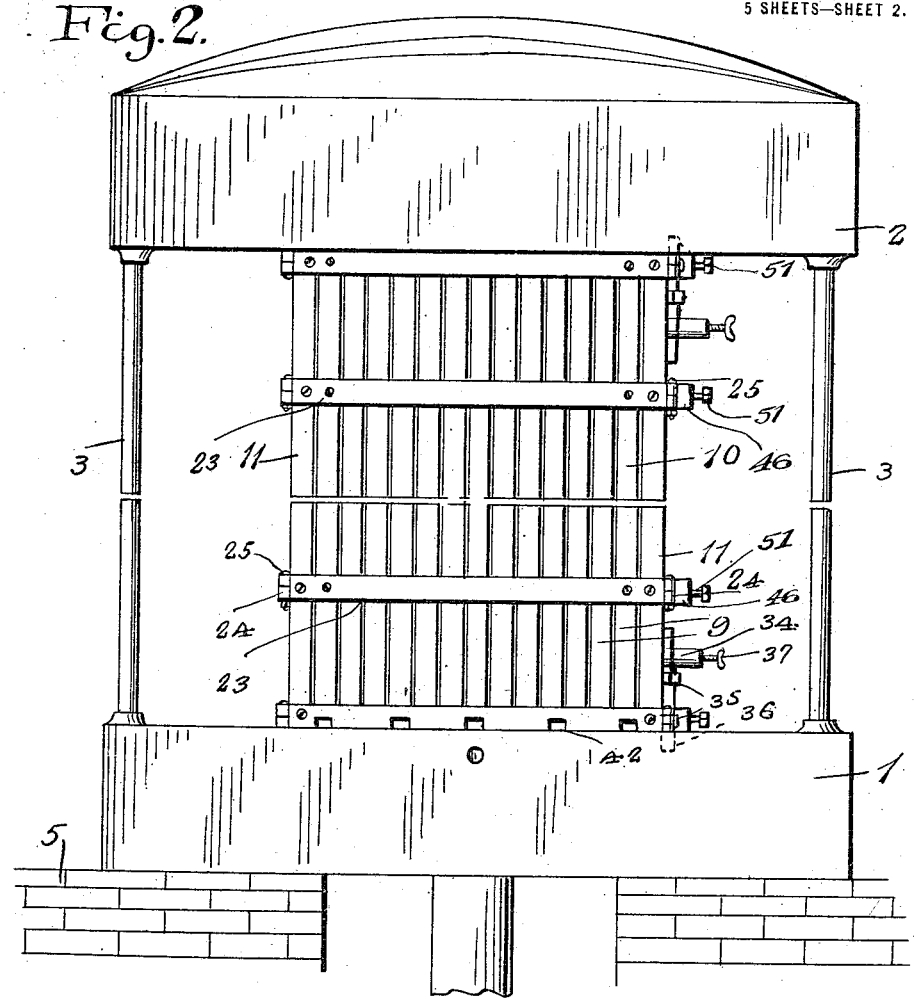

E. N. ARCHAVLIS.
HYDRAULIC MACHINE FOR PRESSING OLIVES.
APPLICATION FILED AUG. 8, 1917.
1,282,021.
Patented Oct. 22, 1918.
5 SHEETS—SHEET 3.
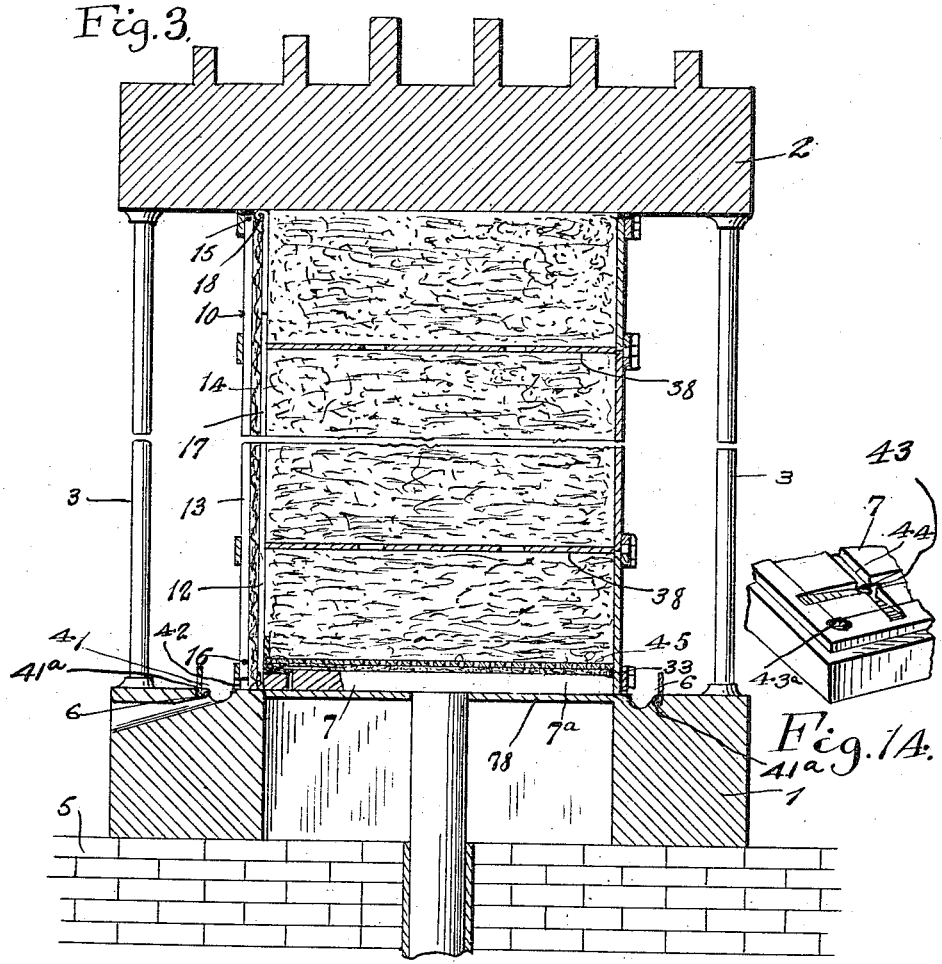
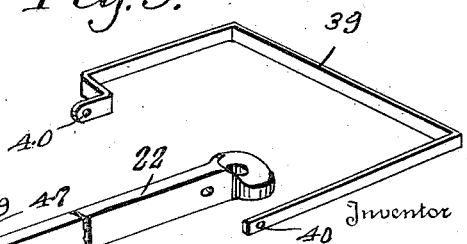
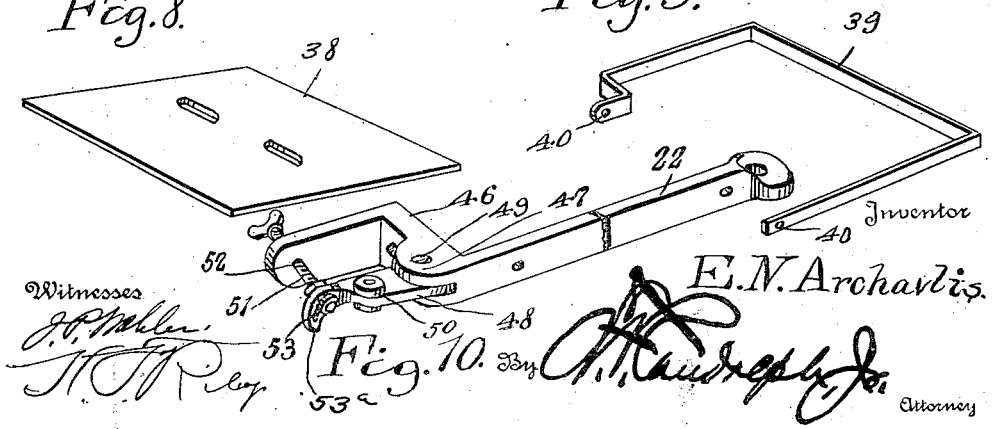

E. N. ARCHAVLIS.
HYDRAULIC MACHINE FOR PRESSING OLIVES.
APPLICATION FILED AUG. 8, 1917.

1,282,021.

Patented Oct. 22, 1918.
5 SHEETS—SHEET 4.

Witnesses

Inventor
E. N. Archavlis.
Attorney

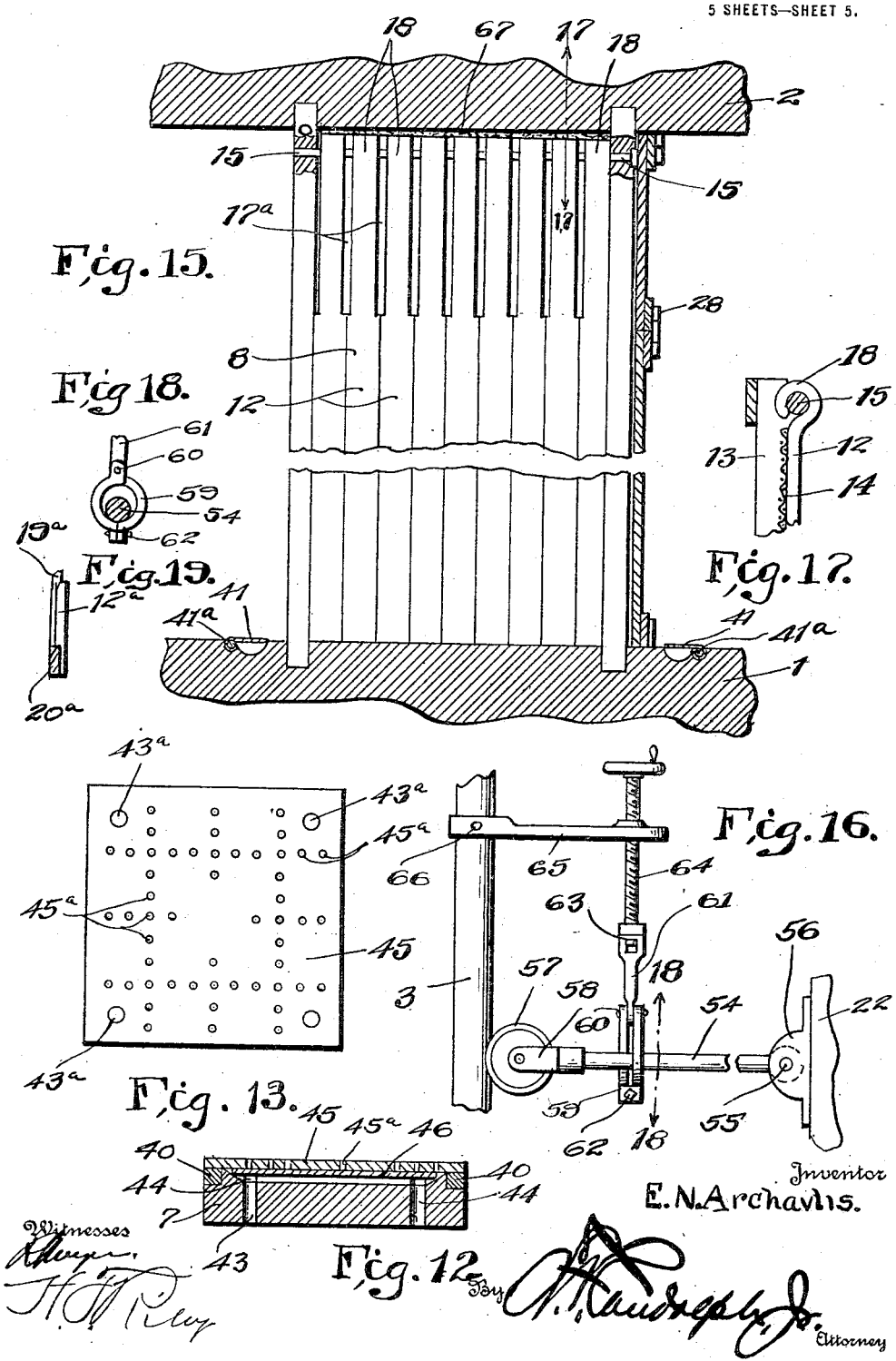

UNITED STATES PATENT OFFICE.

EMMANUEL N. ARCHAVLIS, OF CANTON, OHIO.

HYDRAULIC MACHINE FOR PRESSING OLIVES.

1,282,021.  Specification of Letters Patent.  Patented Oct. 22, 1918.

Application filed August 8, 1917. Serial No. 185,114.

*To all whom it may concern:*

Be it known that I, EMMANUEL N. ARCHAVLIS, born in and formerly resident of Kritsa, Crete, Greece, a subject of the King of Greece, residing at Canton, in the county of Stark and State of Ohio, have invented certain new and useful Improvements in Hydraulic Machines for Pressing Olives; and I do hereby declare the following to be a full, clear, and exact description of the invention, such as will enable others skilled in the art to which it appertains to make and use the same.

The invention relates to a hydraulic machine for pressing olives.

The object of the present invention is to provide a simple, practical and comparatively inexpensive machine of strong, and durable construction designed for pressing olives for extracting the olive oil and equipped with means for straining the same and for enabling a relatively large amount to be compressed without packing the pressed material into a single compact mass, whereby the efficiency of the machine in extracting the oil will be materially increased.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims may be resorted to without departing from the spirit or sacrificing any of the advantages of the invention.

In the drawings:

Fig. 2 is a rear elevation of the same.

Fig. 3 is a vertical sectional view of the hydraulic pressing machine.

Fig. 6 is a detail perspective view of a portion of the sectional door.

Fig. 7 is a detail view of the upper portion of one of the bars of the inner section of the side and rear walls.

Fig. 8 is a detail view of one of the horizontal plates which separate the mass.

Fig. 9 is a detail view of the rake frame for removing the material from the press box.

Fig. 10 is a detail view of one of the horizontal bars illustrating the construction of the locking device.

Fig. 12 is an enlarged detail sectional view through the plunger.

Fig. 13 is a detail view of the perforated plate.

Fig. 14 is a detail perspective view of a portion of the plunger.

Fig. 15 is a transverse sectional view, parts being omitted, illustrating the construction of the rear wall and the side walls.

Fig. 16 is a detail view illustrating the construction of the means for bracing the hinged side wall.

Fig. 17 is a detail view on the line 17—17 of Fig. 15.

Fig. 18 is a detail sectional view on the line 18—18 of Fig. 16.

Fig. 19 is a detail sectional view illustrating the construction of the lower portion of the inner section of one of the side walls.

Like numerals of reference designate corresponding parts in the several figures of the drawings.

Figure 1:
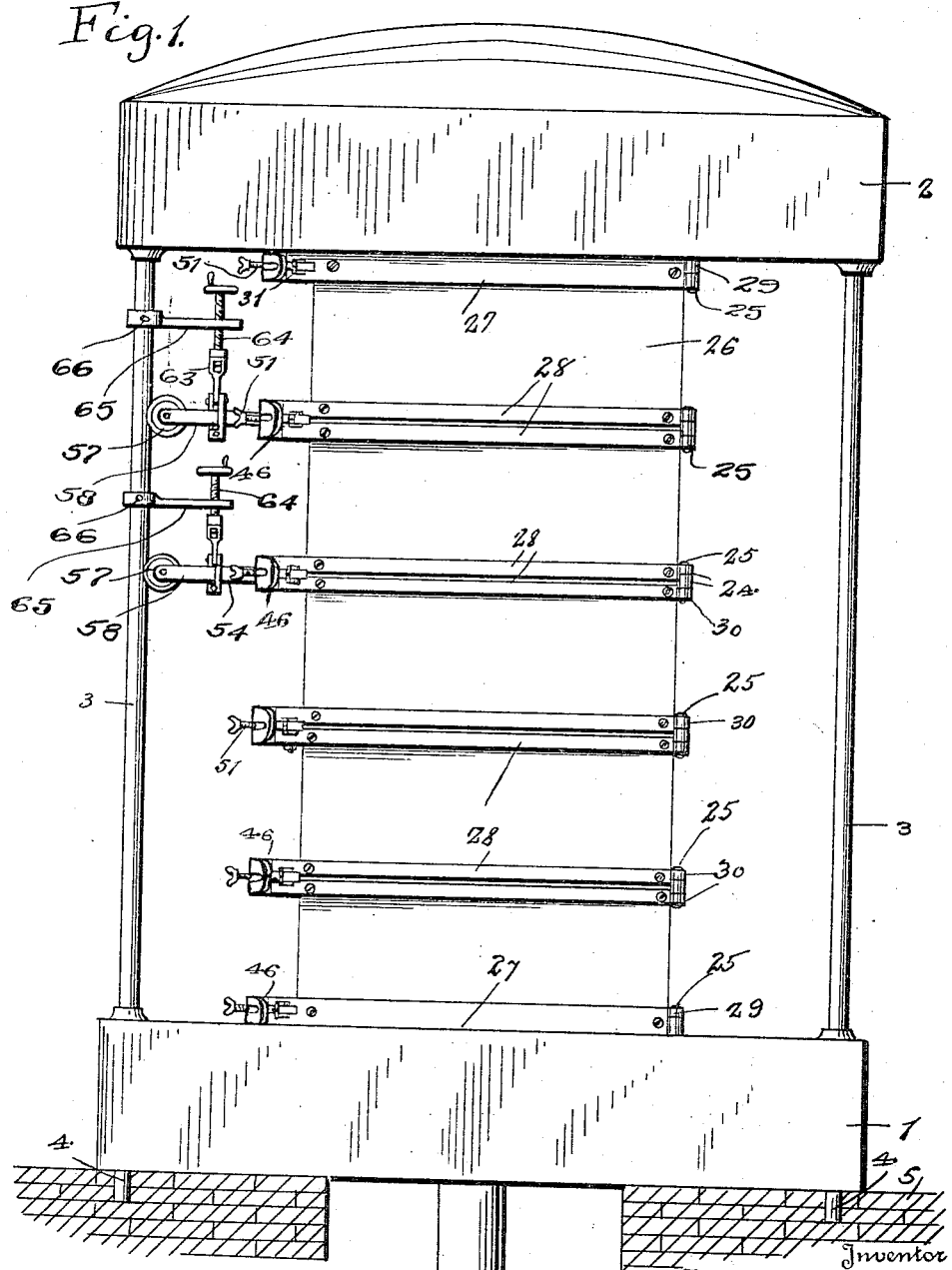
Figure 1 is a front elevation of a hydraulic machine constructed in accordance with this invention.
Figure 11:
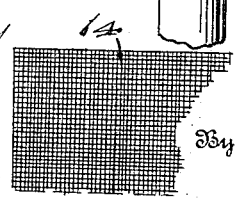
Fig. 11 is a detail view of a portion of the strainer.

In the accompanying drawings, in which is illustrated the preferred embodiment of the invention, the hydraulic olive pressing machine comprises in its construction a base 1, a top or head block 2 and vertical posts or pillars 3 which connect the base and the top to form a supporting frame. The posts or pillars have terminal portions 4 which pierce the base and the top and are suitably secured to the same. The base 1 is mounted on a suitable foundation 5 of masonry or other suitable material and it is provided with a rectangular gutter 6 for conveying away the olive oil from a press box which is located within the frame between the top and bottom thereof and which coacts with a vertically movable plunger 7. the latter being forced upwardly by hydraulic pressure in the operation of the press to extract the oil from the material. The material is introduced into the press in a heated condition so that by heat and pressure every drop of oil may be extracted from the olives.

Figure 4:
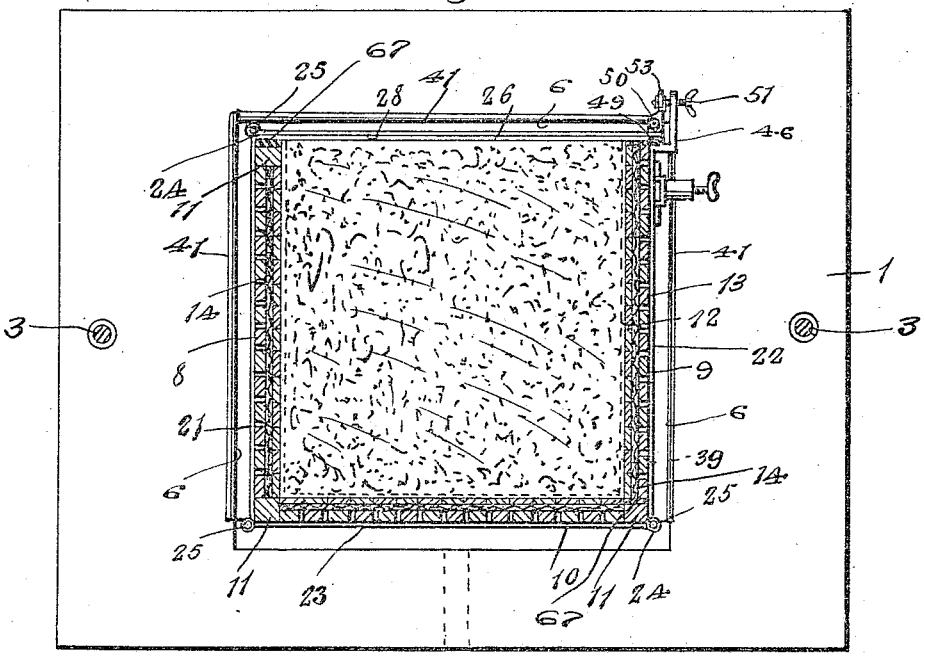
Fig. 4 is a horizontal sectional view of the same.
Figure 5:
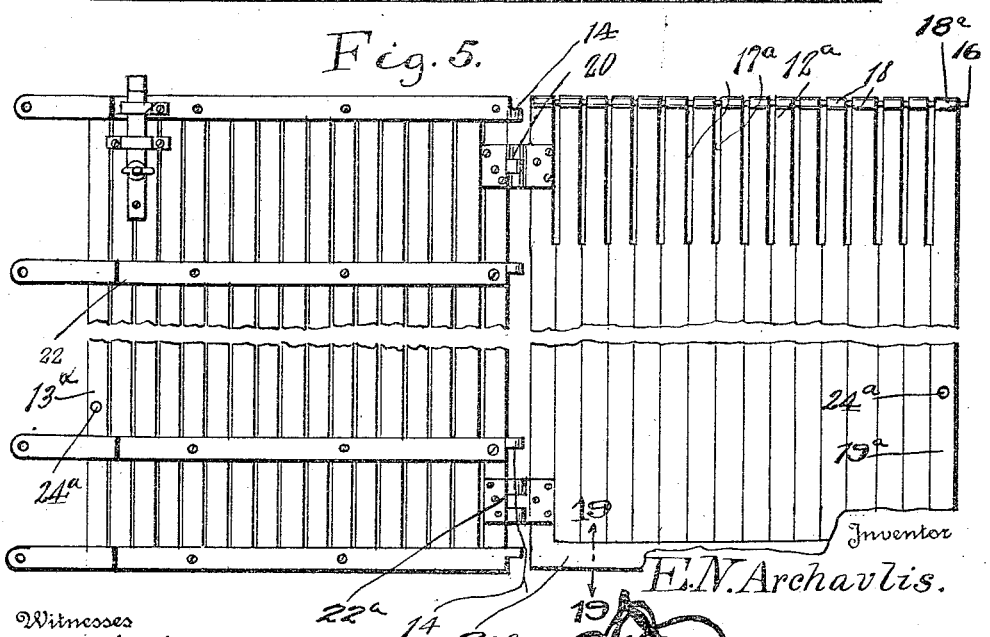
Fig. 5 is an elevation of one of the walls of the press box, the inner and outer sections being swung apart.

The press box, which is rectangular in horizontal section as clearly shown in Fig. 4 of the drawings, is composed of a bottom 7ª, side walls 8 and 9, a rear wall 10 and a sectional door which constitutes the front wall of the press box. The press box is provided at three of its corners with corner posts or bars 11 which are interlocked with the base 1 and head block or top 2, and the side wall 8 and the rear wall 10 are composed of an inner section 12 and outer sections 13 and an interposed strainer 14 of goat's hair or other suitable material, which is held between the inner and outer sections.

The vertical posts 11 receive between them the rear wall of the press box and one of the side walls thereof, and the inner section of each of the screen carrying walls 8 and 10 is composed of vertical bars 17 provided at their upper ends with eyes 18 through which pass rods. The vertical posts are connected by upper horizontal rods 15. The horizontal rods 15 pass through the eyes of the bars 17 of the right hand side wall 8 and the rear wall 10 and hinge the inner sections of such walls to the press box and permit such side and rear wall sections 12 to swing inwardly and outwardly when the press is unlocked and opened. This will enable a new strainer to be substituted for an old one when necessary. The upper portions of the bars 17 are recessed at opposite sides at 17ª to provide slots or openings for the passage of the oil extracted by the press, and the bars of the outer section are spaced apart for this purpose and are recessed at top to receive the eyes 18.

The composite strainer carrying walls 8, 9 and 10 are provided at intervals with horizontal bars 21, 22 and 23 arranged respectively at the right and left hand sides and the back of the press box, viewed from the front thereof. The rear bars 23 and the side bars 21 are provided at their ends with eyes 24 for the reception of bolts 25, and the side bars 22 are provided at their rear ends with eyes 24 to receive the adjacent bolts 25.

The left hand side wall, which is hinged at the back, by the means hereinafter described to enable it to open outwardly, is composed of inner and outer sections 12ª and 13ª, the inner section being composed of vertical bars provided with recesses 17ª and having eyes 18 for the reception of a rod 16 which also passes through eyes 18ª of a marginal frame 19ª consisting of vertical sides and a connecting portion 20ª, the lower ends 21ª of the vertical bars of the inner section being recessed as shown in Fig. 19 to fit the connecting portion 20ª of the frame 19ª. The inner section 12ª is hinged to the outer section at the back by suitable hinges 22ª. The outer section 13ª of the side wall 9 is composed of spaced bars similar to the spaced bars of the right hand side wall and the rear wall. The inner and outer sections of the side 9 are adapted to open to receive a new strainer cloth and they are secured in their closed position by means of a screw or other suitable fastening device adapted to be arranged in screw holes 24ª of the inner and outer sections.

The door is composed of sections 26 and is provided with top and bottom bars 27 and intermediate bars 28, the top and bottom bars 27 being located at the upper and lower edges respectively of the top section and the bottom section of the door, and the bars 28, which are one-half the width of the other bars, approximately, being located at the adjacent edges of the sections 26. The bars 27 and 28 are provided at their right hand ends with eyes 29 and 30 to receive the fastening devices 25 at the front ends of the horizontal side bars of the right hand wall. The top and bottom bars 27 are provided at their left hand ends with bifurcations 31 and the left hand end of the intermediate horizontal bars are recessed at their iner edges at 32 to form similar bifurcations or recesses (see Fig. 6) for engaging with suitable fastening devices for detachably securing the door sections in their position when the same are closed. The door sections are preferably constructed of plates of heavy sheet metal or other suitable material and they are adapted to be successively opened and closed for filling the press box, as hereinafter fully explained.

The plunger 7, which is operated by suitable hydraulic means (not shown), is equipped at its marginal edges with a gasket 33 of rubber or other suitable material adapted to form an air-tight connection where it engages the bars of the inner section of the wall, and the door or door sections, to prevent any of the material escaping beneath the plunger or adhering to the walls. The plunger is provided with openings 43 and it has cruciform grooves 44 in its upper face communicating with the openings 43 which are preferably located at the corners of the plunger, but they may be of any desired number and may be located at any other point. The grooves or gutters 44 permit the oil to flow through the plunger to the bottom of the press box and thence to the exterior gutter 6. The grooves may be arranged in any desired manner and the plunger carries a perforated plate 45 and a strainer cloth 46 interposed between the plunger and the perforated plate. The cloth 46 operates as a strainer and the oil passing through the plunger is strained by the cloth which prevents any liability of particles of the waste being carried through the plunger by the oil extracted from the said material. The perforated plate 45 has a cruciform series of perforations 45ª to agree with the grooves 44. The plunger is also provided with perforations 43ª to receive screws for securing the perforated plate in place.

In filling the press, the material is filled through the first or bottom section which has been previously closed and locked and a horizontal plate 38 is then placed upon the material at the upper edge of the lowermost section of the door and the next section of the door is closed and the press box filled to the upper edge thereof and a second plate 38 is placed in position and this is continued until the press box is filled. Prior to putting in the material a rake frame or scraping device 39 of approximately U-shape is arranged upon the plunger. The raking or scraping frame 39, which is composed of spaced sides and a connecting rear portion, is provided at the front ends of its sides with eyes 40 adapted to be engaged by a hook or member to facilitate the removal of the pressed material after the oil has been extracted. The arrangement of the plates at intervals between the mass of material will prevent the same from being pressed into a single mass and will render the press more effective in extracting oil. The plates may be provided with openings, as shown, for the hand to facilitate handling of the plates, and in removing the material from the press and the gutters may be covered by pieces 41 to prevent any of the material mixing with the oil. The pieces 41 are hinged at 41ª and as illustrated in Fig. 3, are adapted to be swung up to permit the oil to flow into the gutters when the press is in operation. Also the lowermost bars of the walls are provided with recesses 42 to facilitate the escape of the oil to the gutters. The oil may be conveyed from the gutters to any suitable receptacle and the olives may be prepared for the pressing in any desired manner, the olives being subjected to the action of hot water and being ground between rotary stones, (not shown).

The fastening devices for securing the sectional door consists each of an approximately L-shaped supporting arm 46 preferably formed integral with the bars 22 and provided with spaced ears 47 having pivotally mounted between them locking levers 48. The locking levers 48, which are pierced at their inner ends by suitable pivots 49, are provided intermediate of their ends with bosses 50 forming stops for engaging the recessed or bifurcated ends of the horizontal bars of the sectional door. The levers 48 are moved inwardly and outwardly by means of adjusting screws 51 mounted in threaded openings 52 in the supporting arms 46. The inner ends of the adjusting screws are swiveled to curved outer ends 53ª of the levers 48 in slots 52 thereto to permit the necessary play of the parts due to the oscillatory movement of the lever.

In order to enable the hinged side wall 9 to sustain the pressure to which the press is subjected in its operation, the said side is equipped with a hinged brace 54 pivoted at 55 in a suitable bracket 56, which is preferably mounted on the bar 22. Two of the braces 54 are shown, but any desired number may of course be employed and the said brace 54 is equipped at its outer end with a grooved roller or wheel 57 arranged to be carried upwardly into engagement with the adjacent post 3. The wheel or roller 57 is preferably mounted in a bifurcated head 58 and the brace extends through a loop or frame 59 composed of two members of approximately semi-circular form pivoted at 60 to a shank 61 and detachably connected at their opposite ends by a bolt 62 or other suitable fastening device. The shank 61 is swiveled at 63 to an adjusting screw 64 threaded to an arm 65 which is adjustably mounted on the post 3 by a set-screw 66. The loop or frame through which the brace 54 passes enables the brace to have sufficient movement to swing on its pivot and the screw is adapted to be operated to move the brace into and out of engagement with the post. When the brace is freed from the post the loop or frame may be opened and the brace swung downward to arrange it out of the way. The screw will enable sufficient power to be readily applied to force the brace into a horizontal position for bracing the hinged wall 9. The braces 54 are mounted at the upper portion of the press where the greatest pressure is applied in compressing the material. The swivel connection between the shank and the screw enables the screw to readily rotate without twisting the shank.

In practice, the press will be equipped at the upper and lower edges of the walls and at the edges of the doors with suitable gaskets or packing strips 67 which may be held in place in any desired manner. These gaskets will prevent passage of the oil in any direction but that desired in the operation of the press.

What is claimed is:

1. A device of the class described including a press box provided with a wall composed of inner and outer sections hinged together, a screen interposed between the inner and outer sections, and a plunger operating within the press box.

2. A device of the class described including a press box provided with a wall composed of a hingedly supported inner section, an outer section, and an interposed screen arranged between the sections, and means for securing the wall in position for operation.

3. A device of the class described including a press box provided with a wall composed of a hingedly supported inner section and an outer section hinged together at one corner of the press box, a strainer interposed between the inner and outer walls, and fastening means mounted on the outer wall and located at the top and bottom of the press box for securing the said wall in position.

4. A device of the class described including a press box composed of side and rear walls and a sectional door, said walls comprising inner and outer sections and having strainers interposed between the sections, horizontal bars mounted on the outer sections of the said walls and provided at their adjacent ends with means for detachably securing them together, and horizontal bars carried by the sections of the door and provided with means for detachably securing them to the adjacent ends of the horizontal bars of the said walls.

5. A device of the class described including a vertical press box having side walls, a rear wall, and a sectional door, horizontal side and rear bars secured to the said walls and provided at their adjacent ends with eyes, fastening means engaging the eyes and detachably securing the said bars together, horizontal bars carried by the sections of the door, the bars of the door being provided at one end with eyes and the adjacent ends of the bars of the adjacent wall having corresponding eyes to receive fastening bolts, and fastening devices for detachably securing the other ends of the bars of the door sections to the adjacent ends of the bars of the other side wall.

6. A device of the class described including a vertical press box composed of corner bars having top and bottom connecting rods, side and rear walls composed of inner and outer sections, the inner sections being hinged to the top rod, strainers interposed between the inner and outer sections of the walls, a sectional door, means for securing the walls and the sections of the door in their closed position, and a plunger coöperating with the press box.

7. A device of the class described including a main frame comprising a top and base and vertical posts, said base being provided with a gutter, a vertical press box mounted within the frame and provided at its walls with strainers and having openings at the lower edges of its walls adjacent the said gutter, and a plunger coöperating with the press box.

8. A device of the class described including a vertical press box including a door having a horizontal bar hinged at one end and provided at the other end with a recess, a locking device comprising a pivoted lever arranged to fit in the recess and having a boss for engaging the horizontal bar, and a screw connected with the lever for adjusting the same.

9. A device of the class described including a vertical press box including a door having a horizontal bar hinged at one end and provided at the other end with a recess, a locking device comprising a pivoted lever arranged to fit in the recess and having a boss for engaging the horizontal bar, said lever being provided at the outer end with a slot, an approximately L-shaped supporting arm having a portion in approximate parallelism with the lever, and a screw mounted on the said arm and having its inner end swiveled in the slot of the lever for adjusting the latter.

10. A device of the class described including a vertical press box, a plunger operating in the press box and provided with openings and having grooves or gutters communicating with the openings, a trough arranged upon the plunger, and a perforated plate mounted upon the trough.

11. A device of the class described including a press box provided with a wall composed of inner and outer sections and an interposed screen, the inner section consisting of bars recessed at their upper portions to form slots and having eyes, and a rod passing through the eyes and connecting the said bars to form a pintle to permit the said wall to swing inwardly and outwardly.

12. A device of the class described including a press box having a wall, an abutment arranged in spaced relation with the wall, a brace hinged to the wall and arranged to swing upwardly and downwardly to engage it with and disengage it from the abutment, and an adjusting screw for raising and lowering the brace.

13. A device of the class described including a press box having a wall, an abutment, a brace hinged to the wall adapted to swing into and out of position and interposed between the abutment and the press box, said brace being pivoted at one end and provided at the other end with a roller, a screw for adjusting the brace, and means for detachably connecting the brace with the screw.

14. A device of the class described including a press box, a post spaced from the press box and provided with a horizontal arm, a brace hinged to the press box and having a roller and adapted to swing to carry the roller into and out of engagement with the post, an adjusting screw threaded through the arm on the post, and means including a swiveled connection, for connecting the screw and the brace.

15. A device of the class described including a press box, a post spaced from the press box and provided with a horizontal arm, a brace hinged to the press box and having a roller and adapted to swing to carry the roller into and out of engagement with the post, an adjusting screw threaded through the arm on the post, a shank swiveled to the screw, and bars pivoted to the shank and arranged to embrace the brace and having means for detachably securing them together.

16. A device of the class described including a press box provided with a wall hinged at the back and arranged to swing horizontally, said wall being composed of inner and outer sections provided with openings and also hinged together at the back, and a strainer interposed between the inner and outer sections of the said wall.

17. A device of the class described including a press box having a wall hinged at the back and composed of inner and outer sections also hinged together at the back, the inner section being composed of a marginal frame having side and bottom portions and provided at the upper ends of their side portions with eyes, bars provided at their upper ends with eyes and engaged at their lower ends with the bottom portion of the said frame, a pintle passing through the said eyes, and a strainer interposed between the inner and outer sections.

18. A device of the class described including a press box having walls composed of inner and outer sections, the outer section consisting of bars spaced apart to form openings and the inner section being provided with bars having contiguous lower portions and provided at their upper portions with recesses forming openings.

19. A device of the class described including a vertical press box, a plunger head operating in the press box and having a marginal recess and provided with intersecting substantially cruciform grooves, said plunger head being also provided with openings extending through it from the grooves, a top plate carried by the plunger head and provided with a substantially cruciform series of perforations located above the grooves, a strainer arranged between the top plate and the plunger head, and a marginal gasket held in the recess of the top plate.

In testimony whereof I affix my signature in presence of two witnesses.

EMMANUEL N. ARCHAVLIS.

Witnesses:
SOTERIOS NICHOLSON,
M. I. LEWIS.

Copies of this patent may be obtained for five cents each, by addressing the "Commissioner of Patents, Washington, D. C."